United States Patent
Cherry

[15] 3,662,909
[45] May 16, 1972

[54] SADDLE RACK FOR HORSE TRAILER

[72] Inventor: Harold R. Cherry, 1901 Meadowlark, Harrisonville, Mo. 64701

[22] Filed: Mar. 11, 1970

[21] Appl. No.: 18,648

[52] U.S. Cl..............................214/83.24, 214/86, 104/95
[51] Int. Cl.............................................................B60p 3/00
[58] Field of Search......................214/75 H, 83.24, 450, 86; 104/89-95, 126; 198/177

[56] References Cited

UNITED STATES PATENTS

| | | | |
|---|---|---|---|
| 2,428,144 | 9/1947 | Clough | 214/75 H |
| 3,294,267 | 12/1966 | Schweigert | 214/450 |
| 426,727 | 4/1890 | Holston | 104/93 |
| 2,283,359 | 5/1942 | Gaboury | 104/93 X |
| 3,265,011 | 8/1966 | Golden | 104/93 |
| 2,990,788 | 7/1961 | Wallace | 104/126 |

Primary Examiner—Albert J. Makay
Attorney—Scofield, Kokjer, Scofield & Lowe

[57] ABSTRACT

A saddle rack carrier is mountable in the storage compartment of a horse trailer by fore and aft swingable hinges which support a track structure and includes a combination carrier bar and saddle frame which is selectively and movably mounted thereon. To accomplish a selective movable mount, yoke members are fixedly attached to each end portion of the frame and have roller members thereon which engage with the upper surface of the track structure. A flexible support is removably connected with the track and fixedly attached to the central portion of the carrier bar. The outer yoke is fixedly located by a safety ring. In this manner, the outer yoke is removable from the track thereby permitting the carrier bar-frame combination to be moved outwardly on the above-mentioned rollers and a saddle either removed from the frame or placed thereon. The further detaching of the centrally located flexible support permits the saddle frame to be completely removed from the track or to be moved outwardly to an easily accessible location for a user standing exteriorly of the horse trailer.

3 Claims, 6 Drawing Figures

Patented May 16, 1972 3,662,909

INVENTOR.
Harold R. Cherry
BY
Sinfield, Lykjen, Sinfield + Lowe.
ATTORNEYS

SADDLE RACK FOR HORSE TRAILER

BACKGROUND AND BRIEF DESCRIPTION OF THE INVENTION

Existing horse trailers generally have a compartment located below the feeding area in the forward portion of the trailer for storing saddles and other riding equipment. This storage area is sometimes provided with a supporting structure for the saddle and bridle and generally requires that the saddle (or saddles) be jammed into a relatively small space and/or attached to a snap-lock type support. In any event, the previously known supports within the storage compartment of the horse trailer were hard to get at and often times resulted in damaging the stored equipment as well as the painful injuries (skinned knuckles and jammed and pinched fingers) to the one seeking to store or remove his saddle.

I have invented a saddle rack carrier which is easily accessible from a location exterior of the horse trailer and which substantially eliminates the problems of either storing a saddle within the horse trailer storage compartment or removing same therefrom. In this regard, my invention includes hingedly supporting a track structure from the top portion of the storage compartment so that the track structure permits swinging fore and aft movement to compensate for the stopping and starting motion of the vehicle drawn trailer. A saddle frame formed with a carrier bar generally comprises the saddle rack and is movably mounted with respect to the track structure by locating a yoke member at each end of the saddle frame-carrier bar and providing each yoke member with roller wheels so that the roller wheels engage the upper surface of the track structure. In this manner, the saddle frame may be moved with respect to the interior of the horse trailer on the track structure to more optimally locate the frame for easy utilization. The saddle frame may be fixedly held in place by a safety chain which is attached to the outer end of the carrier bar and is looped over a suitably located notch in the outer end portion of the track structure. Further, the central portion of the saddle frame is flexibly connectable with respect to the central portion of the track structure thereby allowing the outer end of the saddle frame and roller yoke combination to be disengaged from its connection with the track structure and lowered with respect thereto for easy access to the forward portion of the bar-frame. Further, with both the central flexible support and the outer chain removed from connection with the track structure, the entire saddle frame combination may be removed or the innermost end moved to the outer end portion of the track structure.

A primary object of my invention is to provide a uniquely constructed easily accessible saddle rack carrier for horse trailers.

Another object of my invention is to provide a uniquely constructed saddle rack carrier for horse trailers which is easily incorporated into existing trailers thereby optimalizing the usability of same.

A further object of my invention is to provide in a mobile vehicle, a uniquely constructed supporting carrier rack suitable to optimalize the storage of articles within the vehicle and to ease the accessibility thereto.

A still further object of my invention is to provide a uniquely constructed storage rack for a mobile vehicle that compensates for sudden starts and stops yet still offers stable and safe supporting of the articles located thereon.

A still further object of my invention is to provide a unique saddle rack carrier for use with horse trailers that permits one saddle to be removed (or added) to the saddle carrying portion thereof while retaining another one in its stored position. It is an important feature of this invention that the saddle frame may either be completely removed from the horse trailer or optimally located at various positions with respect to the horse trailer for ease of loading or unloading.

Other and further objects of the invention, together with the features of novelty appurtenant thereto, will appear in the course of the following description.

DETAILED DESCRIPTION OF THE INVENTION

In the accompanying drawing, which forms a part of the specification and is to be read in conjunction therewith and in which like reference numerals are employed to indicate like parts in the various views.

Figure 1:
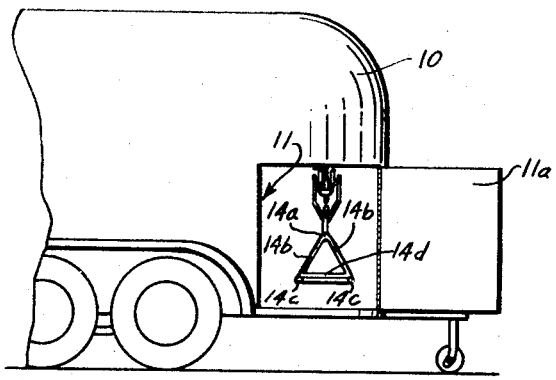
FIG. 1 is a side elevational view of the front portion of a conventional horse trailer with the saddle rack carrier mounted therein.

Turning now more particularly to the drawing, reference numeral 10 is used to designate a conventional horse trailer with a storage compartment 11 located at the forward portion thereof below the trailer feeding area. The storage compartment includes the hingedly connected door 11a which permits access to the storage area from a location exteriorly of same. Generally, the storage compartment runs the entire width of the trailer and defines an area that is capable of holding at least two saddles along with other associated riding equipment.

Figure 5:
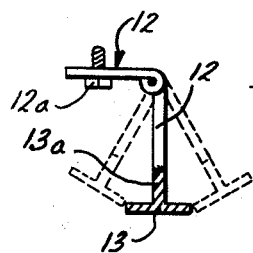
FIG. 5 is an end elevational view taken substantially along the lines 5—5 of FIG. 4 in the direction of the arrows and showing the swingable mounting structure of the track.

My storage device includes a plurality of strap hinges 12 which bolt at 12a to the ceiling or upper surface area of storage compartment 11. These hinges are weldedly connected at their lower end portion to the center web 13a of a track structure 13. The track is generally in the shape of an inverted T-bar (when viewed from the end) so as to provide two roller wheel contacting tracks on the upper surface thereof adjacent web 13a. It should be noted that the hinges 12 are spaced along a line that is transverse to the longitudinal center line of horse trailer 10 and are suitably disposed so that a swinging movement is afforded track 13 due to sudden starts and stops on the part of the trailer. This movement is indicated in FIG. 5 by the broken line position of the combination hinge and track structure.

Figure 6:
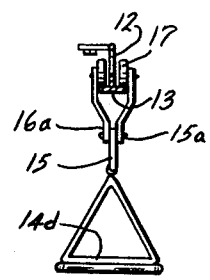
FIG. 6 is an enlarged end view of the saddle frame and track structure shown in FIG. 1.
Figure 3:
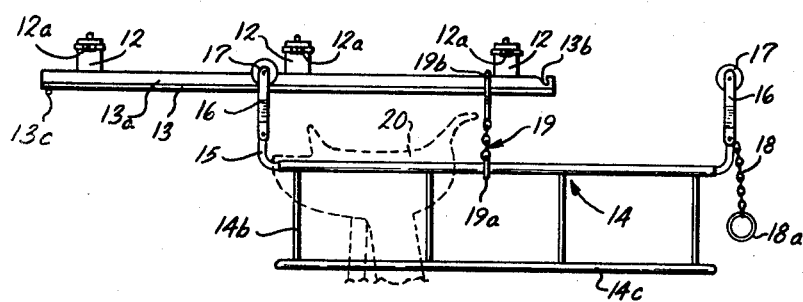
FIG. 3 is a view similar to FIG. 2 showing the safety chain removed from the outer end and the saddle frame movably positioned exteriorly of the horse trailer.
Figure 4:
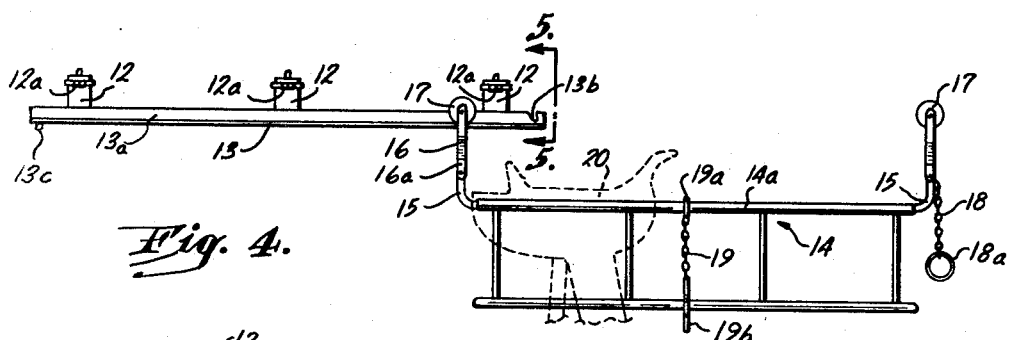
FIG. 4 is a view similar to FIG. 3 with the center flexible support means removed from the track structure to thereby permit the saddle frame to be completely removed from the track structure.

As shown in FIGS. 2-5, a conventional saddle 20 will be carried on a saddle frame generally indicated by the numeral 14. The saddle frame is comprised of a carrier bar 14a which forms the apex of the saddle frame when viewed from the end (see FIGS. 1 and 6). The frame rods 14b are welded to carrier bar 14a and extend at an angle downwardly therefrom and terminate in a lower horizontal frame bar 14c on either side of carrier bar 14a. The end portions of frame 14 are spanned by horizontal rods 14d thereby further reinforcing the structure.

To facilitate the mounting of the saddle frame 14 on track 13, the end portions of carrier bar 14a are bent upwardly at 15. These upper bends provide a mounting area for interconnection of same with yoke 16. Each yoke has a clevised lower end 16a which pivotally interconnects with bends 15 by pin 15a. The upper end portion of the yoke provides a supporting means for two spaced apart roller wheels 17 which are designed to frictionally engage the upper surfaces of track 13 on either side of the central web of the T-bar track. Accordingly, saddle frame 14 is movably mounted with respect to track 13 by the roller wheels and associated yoke structure located at each end of the saddle frame.

Figure 2:
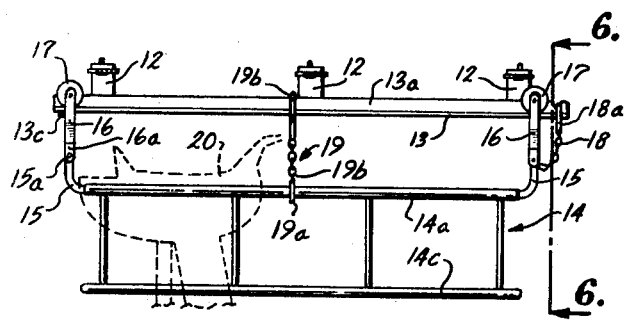
FIG. 2 is an elevational view of the saddle frame attached to the rail structure located within the horse trailer and with a conventional saddle shown in broken lines. The outer end of the saddle frame is shown as the right hand end portion.

To fixedly locate the saddle frame on the track structure, a chain 18 is attached by a suitable pin member (not shown) to the outer yoke 16 and has a safety ring 18a fixedly attached thereon. The ring 18a is designed to be placed in the angled slot 13b which is formed in central web 13a of track structure 13. The ring is appropriately sized so that the outer yoke 16 may not move outwardly off the outer end of track 13. A flexible support 19 is located at the central portion of saddle rack 14 and includes an O-ring 19a, an associated chain 19b and a hook loop 19c which is capable of being hooked over the central web 13a of track 13 on either side of the center strap hinge 12. This central flexible support operates to support the center of the saddle frame with respect to the track structure and also, when located as shown in FIG. 2, precludes and limits the outer movement of the saddle frame with respect to the track structure. Any inner movement of the combined saddle frame and innermost yoke member is precluded by the selected positioning of pin 13c which is transversely welded to the lower surface of the inner end portion of track structure 13, and precludes the inner yoke 17 from slipping off the inner end portion thereof. In this manner, the saddle frame is ideally located for the trailer in that it may not inadvertently fall off of either end of the track structure because of the pin 13c and the safety ring 18a yet may be selectively moved by simple manipulation of the safety ring 18a.

In operation, a conventional saddle 20 is easily loaded in the storage compartment 11 of a horse trailer 10 by removing safety ring 18a and hook 19b so that the saddle frame 19 may be moved outwardly with the outer yoke and roller wheels being moved off of track structure 13. The outer end of the saddle frame may then be lowered until it rests either on the floor of the storage compartment or on the ground (depending on the length of same) and the saddle located on either one of the two (inner or outer) storage spaces on saddle rack 14. If it is desired to locate two saddles on the saddle rack, the first saddle will be put on the innermost half of the saddle rack and hook 19b again looped over the web of the track structure 13. The saddle frame is then rolled inwardly on track structure 13, however, the outer portion and associated yoke and roller wheels still do not engage the track structure. As a result, the outer end portion of the saddle frame is allowed to be inclined downwardly since the slack in the supporting means 19 (chain 19b) is sufficient to allow the inclined orienting of same. As a result, the second saddle is easily located on the outer portion of the saddle frame and, when this is accomplished, the outer yoke member is repositioned with respect to the track structure (as shown in FIG. 2) and safety ring 18a again located in the notch 13b. The loaded saddles are now ready for transporting.

When the destination is reached or when it is desired to unload one or both of the saddles, the procedure is substantially reversed with the safety ring 18a being removed from notch 13b and the outer end of the frame lowered thereby easily locating the outermost saddle for removal from the storage compartment. The second saddle is likewise remove by unhooking the flexible supporting means with respect to track 13 and pulling the saddle frame outwardly so that same moves on the innermost roller wheels 17 until it occupies the position shown in FIG. 4. At this time, the outer end of the saddle frame may be lowered and the innermost saddle easily removed therefrom.

It is possible that the outermost roller wheels may be replaced by any suitable guide means which would contact the upper surface of the track structure, however, I have found that it is more convenient to utilize roller wheels with both yoke members in order to insure easy movement of the saddle frame.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A saddle carrier for horse trailers, said carrier comprising
   a track structure, said track structure operable to be mounted within a storage compartment in said horse trailer,
   a frame, said frame being capable of supporting a saddle thereon,
   a guide means for interconnecting said frame with said track structure, said guide means permitting said frame to be moved with respect to said track structure to to a location that is accessible from the exterior of said storage compartment,
   means for precluding inadvertent movement of said frame with respect to said track structure, and
   means for swingably connecting said track structure transversely to the longitudinal center line of said horse trailer.

2. The invention as in claim 1 wherein said guide means includes a yoke member having roller wheels located thereon, said yoke member being attached to said frame and disposed relative to said track structure so that said wheels contact said track structure and permit said frame to movably depend therefrom.

3. The invention as in claim 1 wherein said device includes at least one flexible support means that interconnects said frame and track structure and which is operable to limit the movement of said frame relative to said track structure both coaxially and transversely thereto.

* * * * *